United States Patent
Hecht

(10) Patent No.: US 8,696,262 B2
(45) Date of Patent: Apr. 15, 2014

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 295 days.

(21) Appl. No.: 13/084,041

(22) Filed: Apr. 11, 2011

(65) Prior Publication Data

US 2011/0255926 A1 Oct. 20, 2011

(30) Foreign Application Priority Data

Apr. 14, 2010 (IL) .......................................... 205091

(51) Int. Cl.
*B23B 27/04* (2006.01)

(52) U.S. Cl.
CPC ..................................... *B23B 27/04* (2013.01)
USPC ......................................... 407/113; 407/117

(58) Field of Classification Search
USPC ................................. 407/109, 110, 113, 117
IPC .............................................. B23B 27/04,27/16
See application file for complete search history.

(56) References Cited

U.S. PATENT DOCUMENTS

| | | | |
|---|---|---|---|
| 4,801,224 A | 1/1989 | Pettersson et al. | |
| 5,743,680 A | 4/1998 | Von Haas et al. | |
| 6,086,291 A | 7/2000 | Hansson et al. | |
| 7,384,218 B2 | 6/2008 | Nagaya et al. | |
| 7,665,933 B2 * | 2/2010 | Nagaya et al. | 407/116 |
| 2006/0147281 A1 | 7/2006 | Nagaya et al. | |
| 2009/0285645 A1 * | 11/2009 | Hecht | 407/107 |

FOREIGN PATENT DOCUMENTS

| | | |
|---|---|---|
| AT | 6939 U | 6/2004 |
| DE | 20 2005 019134 U | 3/2006 |
| EP | 0242343 | 10/1987 |

OTHER PUBLICATIONS

International Search Report dated Jun. 27, 2011 issued in corresponding International Application No. PCT/IL2011/000252.

* cited by examiner

*Primary Examiner* — Andrea Wellington
*Assistant Examiner* — Alan Snyder
(74) *Attorney, Agent, or Firm* — Womble Carlyle

(57) ABSTRACT

A cutting tool used for grooving and turning operations, where a cutting insert is removably securable in a blade-shaped insert holder. The insert holder includes an insert receiving slot having a longitudinally extending upper receiving slot surface with longitudinally separated single pairs of ridge type V-shaped lateral stopping and upper clamping surfaces, the planar surface components of which form different internal angles. The cutting insert includes an upper surface with a single pair of groove type V-shaped upper abutment surfaces longitudinally separated from two pairs of groove type V-shaped lateral abutment surfaces. Clamping contact occurs between the pairs of upper abutment and upper clamping surfaces, and lateral contact only occurs between one surface component of one of the two pairs of lateral abutment surfaces and one surface component of the pair of lateral stopping surfaces for cases of a sufficiently large side load on the cutting insert.

25 Claims, 5 Drawing Sheets

CUTTING TOOL AND CUTTING INSERT THEREFOR

FIELD OF THE INVENTION

The present invention relates to a cutting tool and a cutting insert for use in metal cutting processes in general, and for grooving and turning operations in particular.

BACKGROUND OF THE INVENTION

Within the field of metal cutting tools used for grooving and turning operations, a cutting insert of typically small width and manufactured from a first material may be removably secured to a slotted portion of an insert holder having a similarly small width and manufactured from a second material, the first material being harder than the second material. Cutting forces are generally transmitted through the insert tip and the forward section of the insert holder lower surface, although in some grooving and turning operations a transverse component of the cutting force may initiate lateral displacement of the cutting insert with respect to the insert holder.

U.S. Pat. No. 6,086,291 discloses a cutting tool for parting and grooving operations where the insert holder includes a slot shaped insert seat with upper and lower V-shaped male parts and the cutting insert includes corresponding V-shaped female parts. Each V-shaped male part has a ridge with side surfaces forming an acute angle longitudinally extending between two laterally spaced apart first contact surfaces forming an obtuse wedge angle, and each V-shaped female part has a flute with side surfaces forming an acute angle longitudinally extending between two laterally spaced apart second contact surfaces forming an obtuse wedge angle.

The cutting insert and insert holder are manufactured such that when the insert is mounted in the insert seat, clamping contact is made between the V-shaped male and female parts at the first and second contact surfaces and a small gap is established between the ridge and flute side surfaces. In an operative mode, main forces are directed through the wider obtuse angled first and second contact surfaces, and transverse forces may be directed through the narrower acute angled ridge and flute side surfaces causing one of the ridge side surfaces to make contact with a corresponding flute side surface and absorb the transverse forces.

As the insert holder is configured with narrower acute angled ridges longitudinally extending between the wider obtuse angled first contact surfaces, undesirably difficult and time-consuming machining operations may be required to manufacture the insert holder.

Also, as the ridges and flutes longitudinally extend between the first and second contact surfaces of the V-shaped male and female parts, respectively, this may necessitate an undesirably large distance between the two laterally spaced-apart clamping contact locations on each of the V-shaped male and female parts.

U.S. Pat. No. 7,384,218 discloses a clamping mechanism for an insert detachable tool used for grooving and cutting-off operations, where a cutting insert is detachably mounted on an insert mounting seat of a holder. The insert mounting seat includes upper and lower jaws with V-shaped contacting surfaces extending in a longitudinal direction, where each contacting surface has a first pair of inclined planes and at least one of the contacting surfaces includes a guide part having a second pair of inclined planes.

The cutting insert has top and bottom surfaces with V-shaped contact surfaces which make clamping contact with the contacting surfaces of the upper and lower jaws, respectively, where each contact surface has a pair of convex surfaces with roundness to form a first pair of contacting positions when viewed in cross-section. There is typically no contact between the contact surfaces of the cutting insert and the second pair of inclined planes of the at least one guide part during clamping, although transient contact may occur at a second pair of contacting positions on at least one of the pairs of convex surfaces to smoothly guide and ensure alignment of the cutting insert during assembly to the holder. Also, during a cutting operation where a large load is applied to the cutting insert in the width direction, contact may occur at a second pair of contacting positions on at least one of the pairs of convex surfaces to stably hold the insert.

As the cutting insert is configured with the second pair of contacting positions between the first pair of contacting positions in the width direction, this may necessitate an undesirably large distance between the first pair of contacting positions.

SUMMARY OF THE INVENTION

In accordance with the present invention, there is provided a cutting tool comprising an insert holder manufactured from a first material and a cutting insert manufactured from a second harder material, wherein the cutting insert is removably securable in the insert holder;

the cutting insert comprising:

upper and lower surfaces extending in a common longitudinal direction, with a peripheral side surface extending therebetween;

a first plane parallel to the longitudinal direction and intersecting the upper and lower surfaces;

an upper peripheral edge formed at the intersection of the upper surface with the peripheral side surface, wherein at least one cutting edge is formed on the upper peripheral edge;

a single pair of upper abutment surfaces formed on the upper surface; and at least one pair of lateral abutment surfaces formed on the upper surface, the insert holder comprising:

an insert receiving slot opening out to a front end of the insert holder including upper and lower receiving slot surfaces extending in the longitudinal direction, wherein the upper receiving slot surface includes a single pair of lateral stopping surfaces and a single pair of upper clamping surfaces, wherein:

clamping contact occurs between the pair of upper abutment surfaces and the pair of upper clamping surfaces forward or rearward of the pair of lateral stopping surfaces;

in the absence of a side load on the cutting insert in a direction transverse to the first plane, first and second lateral abutment surface components of one of the at least one pair of lateral abutment surfaces are spaced apart by first and second gaps from first and second stopping surface components of the pair of lateral stopping surfaces, respectively; and in the presence of a sufficiently large side load on the cutting insert in a direction transverse to the first plane, only one of the lateral abutment surface components contacts a corresponding one of the first and second stopping surface components, and wherein:

the pair of upper abutment surfaces and the at least one pair of lateral abutment surfaces are longitudinally separated.

Also in accordance with the present invention, there is provided a cutting insert comprising:

upper and lower surfaces extending in a common longitudinal direction, with a peripheral side surface extending therebetween;

a first plane parallel to the longitudinal direction and intersecting the upper and lower surfaces;

an upper peripheral edge formed at the intersection of the upper surface with the peripheral side surface, wherein at least one cutting edge is formed on the upper peripheral edge;

a single pair of upper abutment surfaces formed on the upper surface; and at least one pair of lateral abutment surfaces formed on the upper surface, wherein:

when the cutting insert is retained in an insert holder;

clamping contact occurs between the pair of upper abutment surfaces and a corresponding pair of surfaces on the insert holder;

in the absence of a side load on the cutting insert in a direction transverse to the first plane, first and second lateral abutment surface components of one of the at least one pair of lateral abutment surfaces are spaced apart by first and second gaps, respectively, from corresponding stopping surface components formed on the insert holder; and in the presence of a sufficiently large side load on the cutting insert in a direction transverse to the first plane, only one of the first and second lateral abutment surface components contacts a corresponding one of said stopping surface components formed on the insert holder, and wherein:

the pair of upper abutment surfaces and the at least one pair of lateral abutment surfaces are longitudinally separated.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
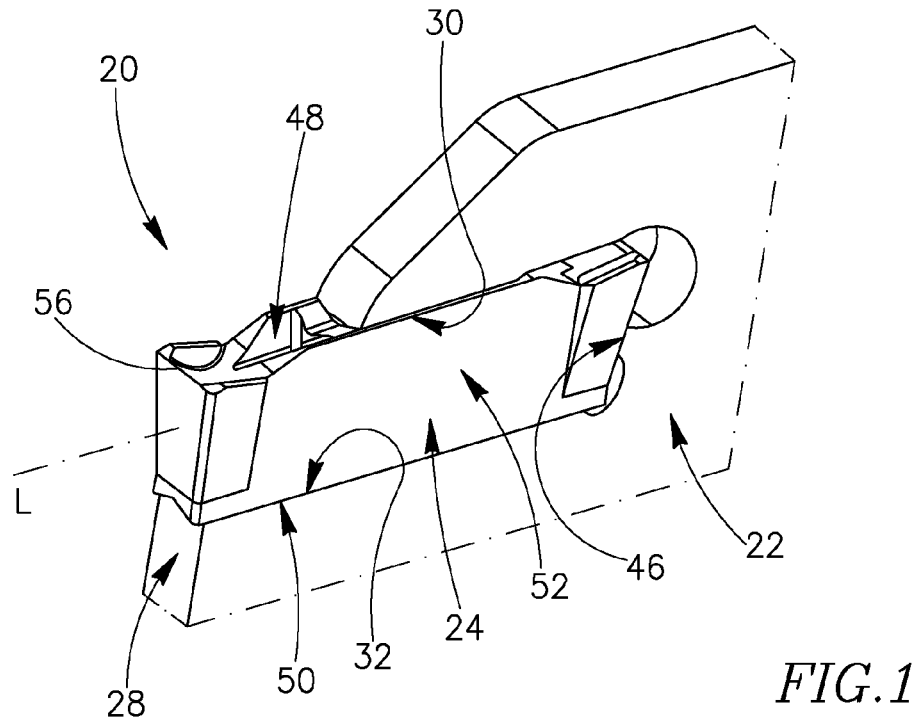
FIG. 1 is a perspective view of a cutting tool in accordance with some embodiments of the present invention.
Figure 2:
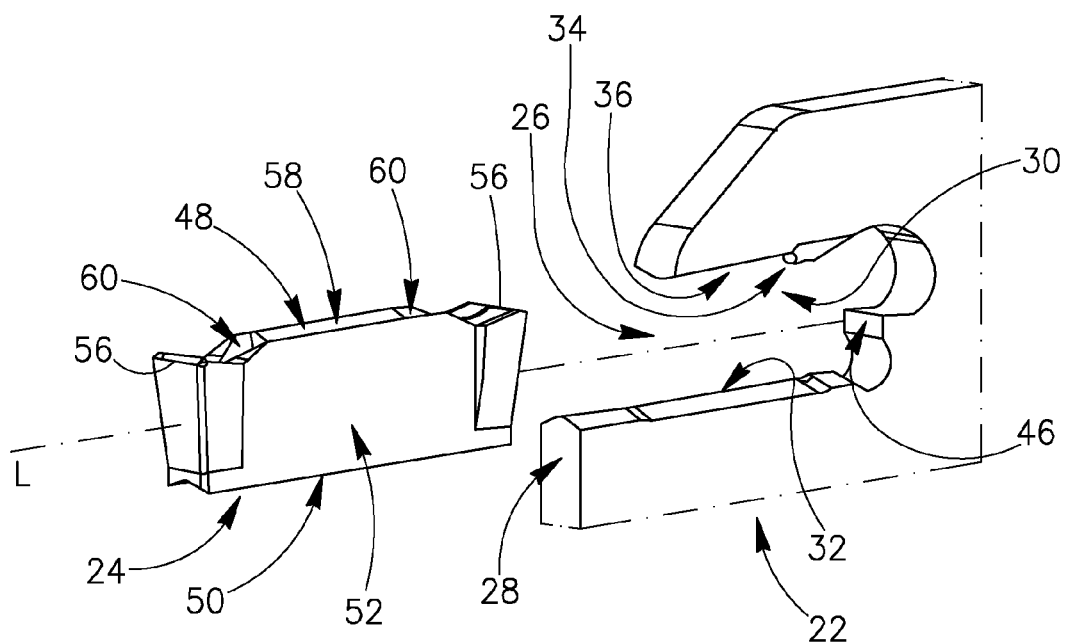
FIG. 2 is an exploded perspective view of the cutting tool shown in FIG. 1.

Attention is first drawn to FIGS. 1 and 2, showing a cutting tool 20 in accordance with some embodiments of the present invention, used for grooving and turning operations. The cutting tool 20 is in the form of a blade-shaped insert holder 22 manufactured from a first material and a cutting insert 24 manufactured from a second harder material, where the cutting insert 24 is removably secured in the insert holder 22 by means of self clamping. The cutting insert 24 may be manufactured by form pressing and sintering a carbide powder such as Tungsten Carbide.

Figure 3:
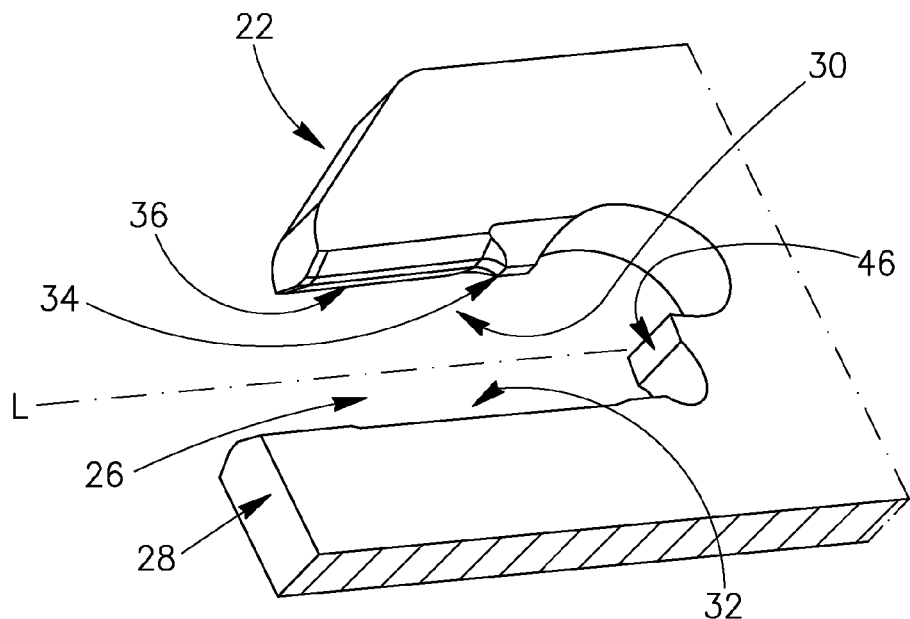
FIG. 3 is a perspective view of the insert holder in accordance with some embodiments of the present invention.
Figure 4:
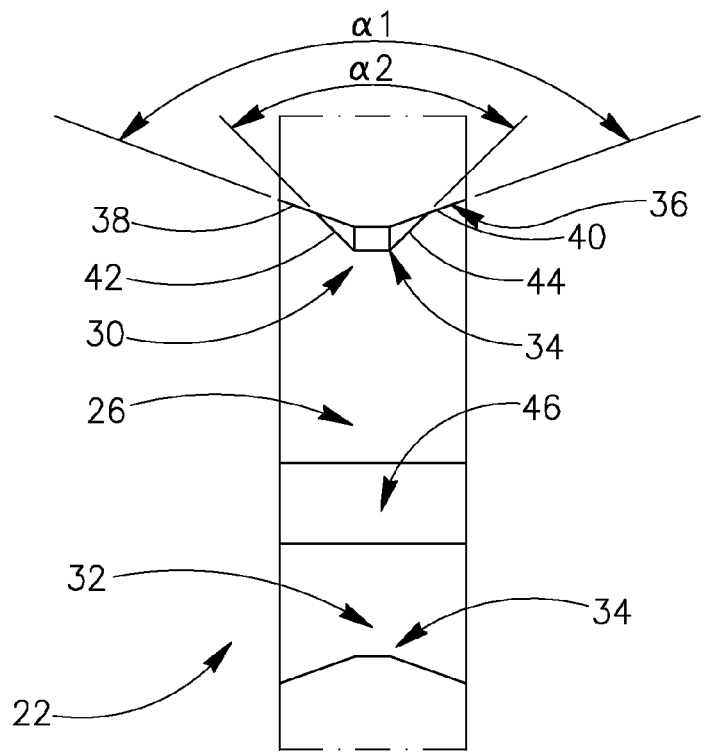
FIG. 4 is a forward end view of the insert holder shown in FIG. 3.

As shown in FIGS. 3 and 4, the insert holder 22 includes an insert receiving slot 26 opening out to a front end 28 of the insert holder 22 having upper and lower receiving slot surfaces 30, 32 extending in a common longitudinal direction L. The upper receiving slot surface 30 includes a single pair of lateral stopping surfaces 34 and a single pair of upper clamping surfaces 36 which are longitudinally separated and each of which may be generally V-shaped.

In other embodiments of the present invention (not shown), the insert holder 22 may include a relatively thin dividing slot extending rearward from the insert receiving slot 26, with the cutting insert 24 removably secured in the insert holder 22 by means of a clamping screw transversely intersecting the dividing slot.

It should be appreciated that use of the term "V-shaped" throughout the description and claims, is not restricted to a pair of surfaces with two planar surface components forming a 'V' shape and intersecting at a vertex point (when viewed in cross-section), but also accounts for two non-planar surface components and an additional planar or curved surface joining the surface components.

In some embodiments of the present invention, the pair of upper clamping surfaces 36 may be of a male ridge type, having planar first and second clamping surface components 38, 40 forming an internal first angle $\alpha 1$, and the pair of lateral stopping surfaces 34 may also be of a male ridge type, having planar first and second stopping surface components 42, 44 forming an internal second angle $\alpha 2$, where the internal first angle $\alpha 1$ is greater than the internal second angle $\alpha 2$.

In some embodiments, the first angle $\alpha 1$ may be obtuse and the second angle $\alpha 2$ may be acute.

It should be appreciated that use of the terms "internal angle" and "external angle" throughout the description and claims refers to an angle between two planar surface components of a pair of surfaces as measured internal and external to the member on which the two surface components are formed, respectively.

It should be emphasized that the upper receiving slot surface 30, having longitudinally separated pairs of upper clamping surfaces 36 and lateral stopping surfaces 34 both of a male ridge type with planar components, enables the insert holder 22 to be manufactured with increased efficiency.

In some embodiments, the pair of lateral stopping surfaces 34 may be adjacent a rear end 46 of the insert receiving slot 26 and the pair of upper clamping surfaces 36 may be positioned forward thereof.

It should be appreciated that use of the terms "forward" and "rearward" throughout the description and claims refer to a relative position in the longitudinal direction L towards the left and right, respectively, in FIGS. 1 to 3 and 7.

Figure 5:
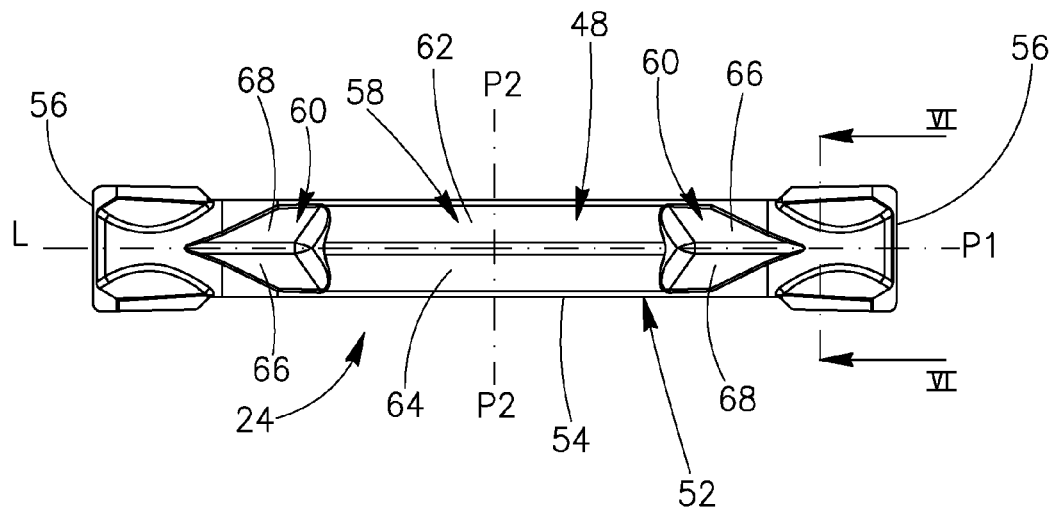
FIG. 5 is a top view of a cutting insert in accordance with some embodiments of the present invention.
Figure 6:
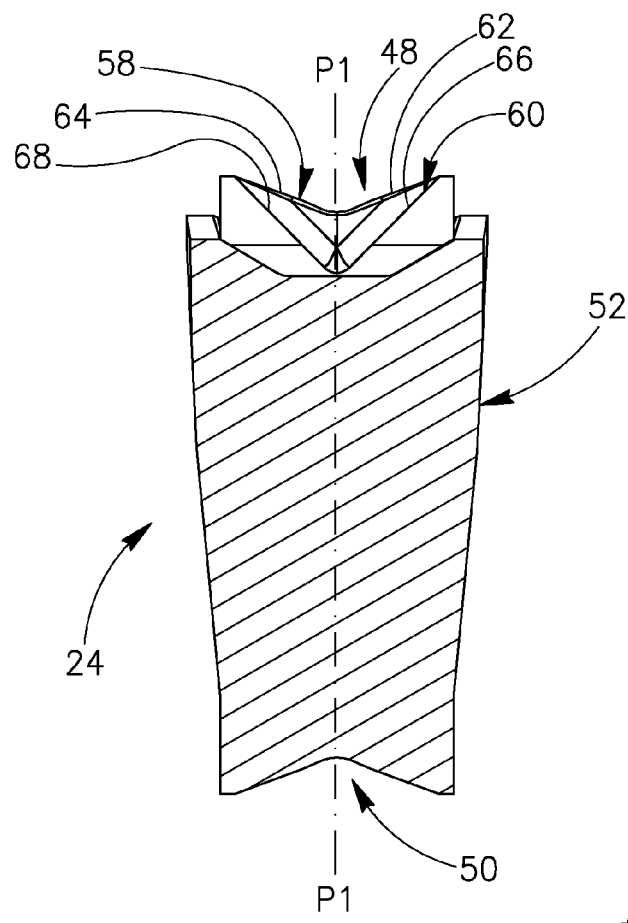
FIG. 6 is a cross-sectional view of the cutting insert shown in FIG. 5 taken along the line VI-VI.

As shown in FIGS. 5 and 6, the cutting insert 24 includes upper and lower surfaces 48, 50 each extending in the longitudinal direction L, with a peripheral side surface 52 extending therebetween and an upper peripheral edge 54 formed at the intersection of the upper surface 48 with the peripheral side surface 52.

In some embodiments of the present invention, the cutting insert 24 may exhibit mirror symmetry about a first plane P1 parallel to the longitudinal direction L and intersecting the upper and lower surfaces 48, 50.

Also, in some embodiments, the cutting insert 24 may exhibit mirror symmetry about a second plane P2 perpendicular to the first plane P1.

In some embodiments, the cutting insert 24 may have two cutting edges 56 formed at longitudinally distal portions of the upper peripheral edge 54 intersecting the first plane P1, and a single pair of upper abutment surfaces 58 formed on the upper surface 48 longitudinally between and separated from two pairs of lateral abutment surfaces 60. The pair of upper abutment surfaces 58 and the two pairs of lateral abutment surfaces 60 may each be generally V-shaped. Thus, in some embodiments, the cutting insert is a double-ended grooving or parting insert, which is receivable into a tool holder slot and clamped between its upper and lower surfaces.

Figure 7:
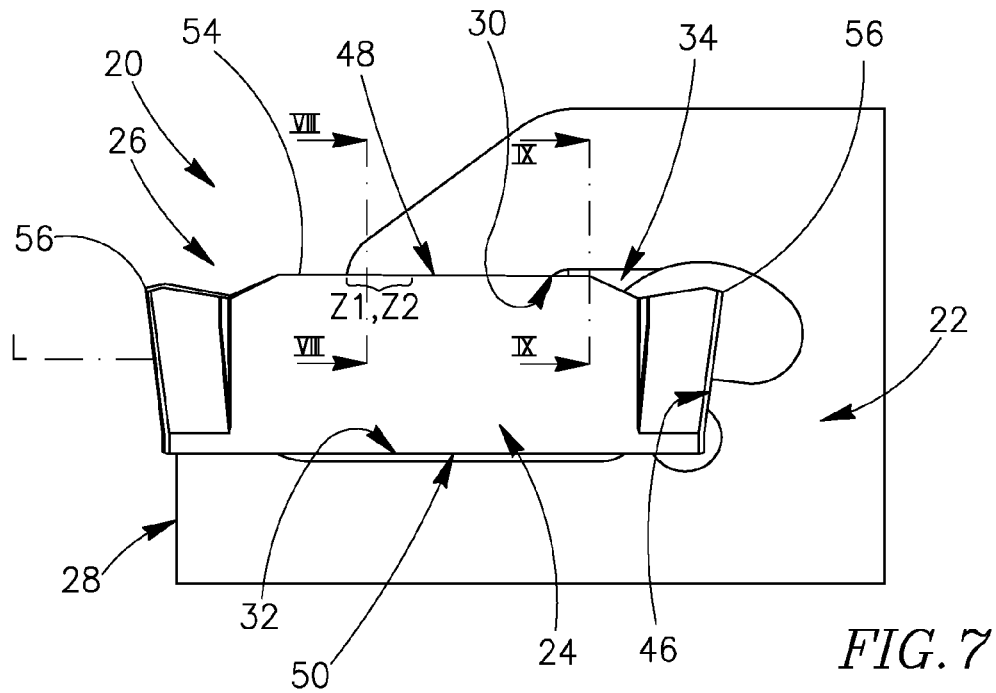
FIG. 7 is a side view of the cutting tool shown in FIG. 1.
Figure 8:
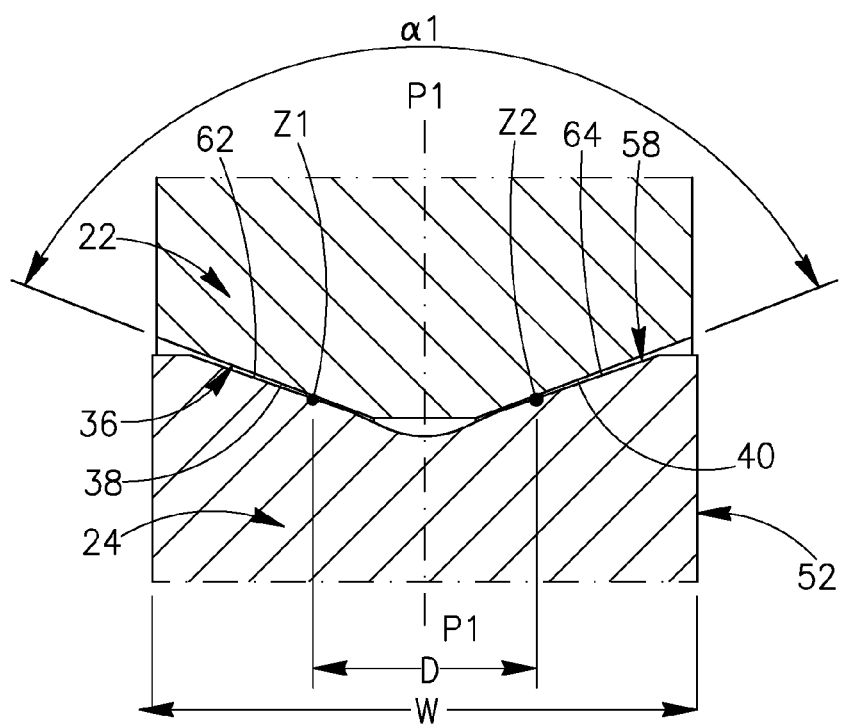
FIG. 8 is a cross-sectional view of the cutting tool shown in FIG. 7 taken along the line VIII-VIII.

As shown in FIGS. 7 and 8, the pair of upper abutment surfaces 58 may be of a female groove type, having first and second upper abutment surface components 62, 64 making clamping contact with the first and second clamping surface components 38, 40 of the pair of upper clamping surfaces 36 at first and second clamping contact zones Z1, Z2, respectively. The first and second clamping contact zones Z1, Z2 extend along a short portion of the upper receiving slot surface 30 forward of the pair of lateral stopping surfaces 34.

In other embodiments of the present invention (not shown), the pair of upper clamping surfaces 36 may be adjacent the rear end 46 of the insert receiving slot 26 and the pair of lateral stopping surfaces 34 may be positioned forward thereof, such that clamping contact occurs between the first and second clamping surface components 38, 40 and the first and second upper abutment surface components 62, 64, respectively, at first and second clamping contact zones Z1, Z2 rearward of the pair of lateral stopping surfaces 34.

In some embodiments of the present invention, the first and second upper abutment surface components 62, 64 may be non-planar, each outwardly convex and making contact with the first and second clamping surface components 38, 40 at two points separated by a contact distance D along the first and second clamping contact zones Z1, Z2, respectively, when viewed in cross-section. The cutting insert 24 has a width W when viewed in the same cross-section, and the contact distance D is equal to or less than 0.50 W.

In other embodiments of the present invention (not shown), the first and second upper abutment surface components 62, 64 may be planar, forming an external first angle slightly greater than the internal first angle α1 formed between the first and second clamping surface components 38, 40, to ensure that clamping contact occurs towards the first plane P1.

It should be emphasized that the longitudinal separation of the pairs of upper clamping and lateral stopping surfaces 36, 34 on the upper receiving slot surface 30 of the insert holder 22 and the longitudinal separation of the pairs of upper abutment and lateral abutment surfaces 58, 60 on the upper surface 48 of the cutting insert 24, enables the clamping contact zones Z1, Z2 to be positioned forward or rearward of the pair of lateral stopping surfaces 34 and the contact distance D between the clamping contact zones Z1, Z2 to be optimized.

As shown in FIGS. 5 and 6, the two pairs of lateral abutment surfaces 60 may be of a female groove type, each recessed with respect to the pair of upper abutment surfaces 58 and having planar first and second lateral abutment surface components 66, 68.

Figure 9A:
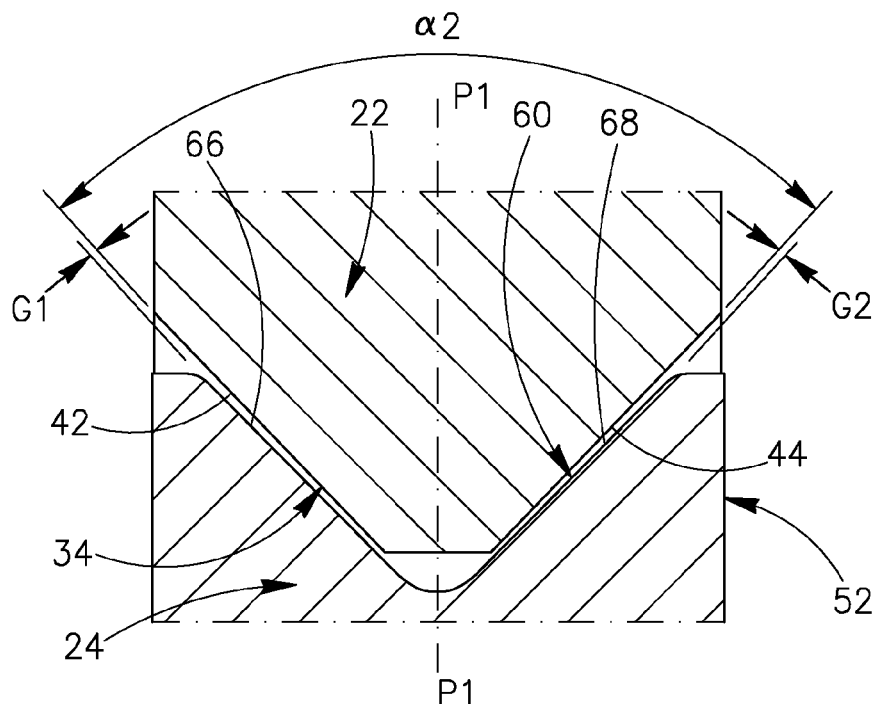
FIG. 9a is a typical cross-sectional view of the cutting tool shown in FIG. 7 taken along the line IX-IX.

FIG. 7 shows a side view of the cutting insert 24 retained in the insert holder 22 and FIG. 9a shows a cross-section of FIG. 7 in the case where no lateral force is applied to the cutting insert 24 in a direction transverse to the first plane P1. As best seen in FIG. 9a, the one of the two pairs of lateral abutment surfaces 60 positioned most rearward of the operative cutting edge 56 forms equal first and second gaps G1, G2 between its first and second lateral abutment surface components 66, 68 and the first and second stopping surface components 42, 44 of the pair of lateral stopping surfaces 34, respectively, when viewed in cross-section. Thus, in the absence of any such lateral force, or in the presence of an insufficiently large force, neither the first nor the second lateral abutment surface component 66, 68 abuts an opposing first or second stopping surface component 42, 44.

Figure 9B:
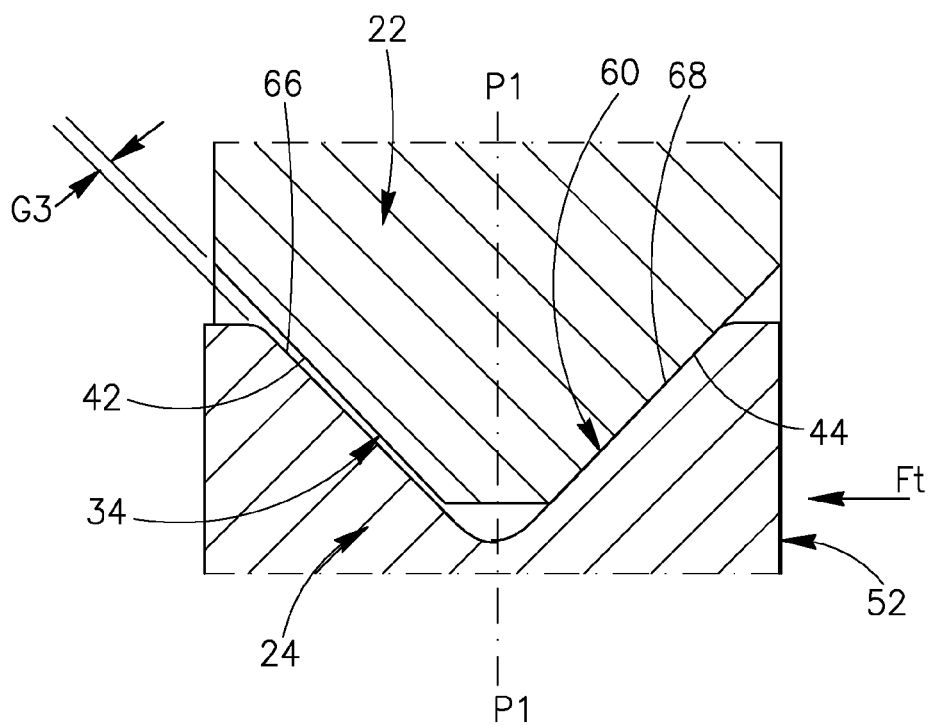
FIG. 9b is a cross-sectional view of the cutting tool shown in FIG. 7 taken along the line IX-IX for cases of a side load on the cutting insert.

FIG. 9b shows a cross-section of FIG. 7 in the case where a sufficiently large lateral force Ft ("side load") is applied on the cutting insert 24 in a direction transverse to the first plane P1. Since, in FIG. 9b, the side load Ft is sufficiently large, it causes lateral movement of the cutting insert 24 with respect to the insert receiving slot 26 of the insert holder 22, until lateral contact occurs between one of the first and second lateral abutment surface components 66, 68 of the pair of lateral abutment surfaces 60 positioned most rearward of the operative cutting edge 56 and one of the first and second stopping surface components 42, 44, respectively.

FIG. 9b shows the second lateral abutment surface component 68 of the above-mentioned pair of lateral abutment surfaces 60 making lateral contact with the second stopping surface component 44 as a result of the side load Ft applied towards a portion of peripheral side surface 52 of the cutting insert 24 substantially parallel to the first plane P1 and adjacent the above-mentioned second lateral abutment surface component 68. A third gap G3 greater than each of the first and second gaps G1, G2, is simultaneously formed between the first lateral abutment surface component 66 of the above-mentioned pair of lateral abutment surfaces 60 and the first stopping surface component 42.

Although the present invention has been described to a certain degree of particularity, it should be understood that various alterations and modifications could be made without departing from the spirit or scope of the invention as hereinafter claimed.

What is claimed is:

1. A cutting tool (20) comprising an insert holder (22) manufactured from a first material and a cutting insert (24) manufactured from a second harder material, wherein the cutting insert (24) is removably securable in the insert holder (22);

the cutting insert (24) comprising:
upper and lower surfaces (48, 50) extending in a common longitudinal direction (L), with a peripheral side surface (52) extending therebetween;
a first plane (P1) parallel to the longitudinal direction (L) and intersecting the upper and lower surfaces (48, 50);
an upper peripheral edge (54) formed at the intersection of the upper surface (48) with the peripheral side surface (52), wherein at least one cutting edge (56) is formed on the upper peripheral edge (54);
a single pair of upper abutment surfaces (58) formed on the upper surface (48); and
at least one pair of lateral abutment surfaces (60) formed on the upper surface (48), the insert holder (22) comprising:
an insert receiving slot (26) opening out to a front end (28) of the insert holder (22) including upper and lower receiving slot surfaces (30, 32) extending in the longitudinal direction (L), wherein the upper receiving slot surface (30) includes a single pair of lateral stopping surfaces (34) and a single pair of upper clamping surfaces (36), wherein:
clamping contact occurs between the pair of upper abutment surfaces (58) and the pair of upper clamping surfaces (36) forward or rearward of the pair of lateral stopping surfaces (34);
in the absence of a side load (Ft) on the cutting insert (24) in a direction transverse to the first plane (P1), first and second lateral abutment surface components (66, 68) of one of the at least one pair of lateral abutment surfaces (60) are spaced apart by first and second gaps (G1, G2) from first and second stopping surface components (42, 44) of the pair of lateral stopping surfaces (34), respectively; and
in the presence of a sufficiently large side load (Ft) on the cutting insert (24) in a direction transverse to the first plane (P1), only one of the lateral abutment surface components (66, 68) contacts a corresponding one of the first and second stopping surface components (42, 44),
and wherein:
the pair of upper abutment surfaces (58) and the at least one pair of lateral abutment surfaces (60) are separated in the longitudinal direction forward or rearward of one another.

2. The cutting tool (20) according to claim 1, wherein the pair of upper abutment surfaces (58) and the at least one pair of lateral abutment surfaces (60) are generally V-shaped of a female groove type, and the pair of lateral stopping surfaces (34) and the pair of upper clamping surfaces (36) are generally V-shaped of a male ridge type.

3. The cutting tool (20) according to claim 1, wherein the pair of lateral stopping surfaces (34) is adjacent a rear end (46) of the insert receiving slot (26), and
wherein clamping contact occurs between the pair of upper abutment surfaces (58) and the pair of upper clamping surfaces (36) forward of the pair of lateral stopping surfaces (34).

4. The cutting tool (20) according to claim 1, wherein:
first and second clamping surface components (38, 40) of the pair of upper clamping surfaces (36) are planar forming an internal first angle ($\alpha 1$) and the first and second stopping surface components (42, 44) of the pair of lateral stopping surfaces (34) are planar forming an internal second angle ($\alpha 2$), and
wherein the first angle ($\alpha 1$) and the second angle ($\alpha 2$) are different.

5. The cutting tool (20) according to claim 4, wherein the first angle ($\alpha 1$) is greater than the second angle ($\alpha 2$).

6. The cutting tool (20) according to claim 4, wherein the first angle ($\alpha 1$) is obtuse and the second angle ($\alpha 2$) is acute.

7. The cutting tool (20) according to claim 1, wherein the pair of upper clamping surfaces (36) and the pair of lateral stopping surfaces (34) are longitudinally separated.

8. The cutting tool (20) according to claim 1, wherein the first gap (G1) is equal to the second gap (G2).

9. The cutting tool (20) according to claim 1, wherein the cutting insert (24) exhibits mirror symmetry about the first plane (P1).

10. A cutting tool (20) comprising an insert holder (22) manufactured from a first material and a cutting insert (24) manufactured from a second harder material, wherein the cutting insert (24) is removably securable in the insert holder (22);
the cutting insert (24) comprising:
upper and lower surfaces (48, 50) extending in a common longitudinal direction (L), with a peripheral side surface (52) extending therebetween;
a first plane (P1) parallel to the longitudinal direction (L) and intersecting the upper and lower surfaces (48, 50);
an upper peripheral edge (54) formed at the intersection of the upper surface (48) with the peripheral side surface (52), wherein at least one cutting edge (56) is formed on the upper peripheral edge (54);
a single pair of upper abutment surfaces (58) formed on the upper surface (48); and
at least one pair of lateral abutment surfaces (60) formed on the upper surface (48),
the insert holder (22) comprising:
an insert receiving slot (26) opening out to a front end (28) of the insert holder (22) including upper and lower receiving slot surfaces (30, 32) extending in the longitudinal direction (L), wherein the upper receiving slot surface (30) includes a single pair of lateral stopping surfaces (34) and a single pair of upper clamping surfaces (36),
wherein:
clamping contact occurs between the pair of upper abutment surfaces (58) and the pair of upper clamping surfaces (36) forward or rearward of the pair of lateral stopping surfaces (34);
in the absence of a side load (Ft) on the cutting insert (24) in a direction transverse to the first plane (P1), first and second lateral abutment surface components (66, 68) of one of the at least one pair of lateral abutment surfaces (60) are spaced apart by first and second gaps (G1, G2) from first and second stopping surface components (42, 44) of the pair of lateral stopping surfaces (34), respectively; and
in the presence of a sufficiently large side load (Ft) on the cutting insert (24) in a direction transverse to the first plane (P1), only one of the lateral abutment surface components (66, 68) contacts a corresponding one of the first and second stopping surface components (42, 44),
and wherein:
the pair of upper abutment surfaces (58) and the at least one pair of lateral abutment surfaces (60) are longitudinally separated,
wherein two cutting edges (56) are formed on the upper peripheral edge (54) and two pairs of lateral abutment surfaces (60) are formed on the upper surface (48).

11. The cutting tool (20) according to claim 1, wherein the cutting insert (24) exhibits minor symmetry about a second plane (P2) perpendicular to the first plane (P1).

12. The cutting tool (20) according to claim 1, wherein the at least one pair of lateral abutment surfaces (60) is recessed with respect to the pair of upper abutment surfaces (58).

13. The cutting tool (20) according to claim 1, wherein clamping contact occurs at first and second clamping contact zones (Z1, Z2) on first and second upper abutment surface components (62, 64) of the pair of upper abutment surfaces (58), respectively,
wherein the first and second clamping contact zones (Z1, Z2) form two points separated by a contact distance (D) and the cutting insert (24) has a width (W) when viewed in cross-section, and
wherein the contact distance (D) is equal to or less than 0.50 W.

14. The cutting tool (20) according to claim 1, wherein the first plane (P1) intersects the at least one cutting edge (56).

15. A cutting insert (24) comprising:
upper and lower surfaces (48, 50) extending in a common longitudinal direction (L), with a peripheral side surface (52) extending therebetween;

a first plane (P1) parallel to the longitudinal direction (L) and intersecting the upper and lower surfaces (48, 50);

an upper peripheral edge (54) formed at the intersection of the upper surface (48) with the peripheral side surface (52), wherein at least one cutting edge (56) is formed on the upper peripheral edge (54);

a single pair of upper abutment surfaces (58) formed on the upper surface (48); and at least one pair of lateral abutment surfaces (60) formed on the upper surface (48), wherein:

when the cutting insert (24) is retained in an insert holder (22);

clamping contact occurs between the pair of upper abutment surfaces (58) and a corresponding pair of surfaces on the insert holder (22);

in the absence of a side load (Ft) on the cutting insert (24) in a direction transverse to the first plane (P1), first and second lateral abutment surface components (66, 68) of one of the at least one pair of lateral abutment surfaces (60) are spaced apart by first and second gaps (G1, G2), respectively, from corresponding stopping surface components formed on the insert holder (22); and in the presence of a sufficiently large side load (Ft) on the cutting insert (24) in a direction transverse to the first plane (P1), only one of the first and second lateral abutment surface components (66, 68) contacts a corresponding one of said stopping surface components formed on the insert holder (22), and wherein:

the pair of upper abutment surfaces (58) and the at least one pair of lateral abutment surfaces (60) are separated in the longitudinal direction forward or rearward of one another.

16. The cutting insert (24) according to claim 15, wherein the pair of upper abutment surfaces (58) and the at least one pair of lateral abutment surfaces (60) are generally V-shaped of a female groove type.

17. The cutting insert (24) according to claim 15, wherein the cutting insert (24) exhibits minor symmetry about the first plane (P1).

18. A cutting insert (24) comprising:

upper and lower surfaces (48, 50) extending in a common longitudinal direction (L), with a peripheral side surface (52) extending therebetween;

a first plane (P1) parallel to the longitudinal direction (L) and intersecting the upper and lower surfaces (48, 50);

an upper peripheral edge (54) formed at the intersection of the upper surface (48) with the peripheral side surface (52), wherein at least one cutting edge (56) is formed on the upper peripheral edge (54);

a single pair of upper abutment surfaces (58) formed on the upper surface (48); and at least one pair of lateral abutment surfaces (60) formed on the upper surface (48), wherein:

when the cutting insert (24) is retained in an insert holder (22);

clamping contact occurs between the pair of upper abutment surfaces (58) and a corresponding pair of surfaces on the insert holder (22);

in the absence of a side load (Ft) on the cutting insert (24) in a direction transverse to the first plane (P1), first and second lateral abutment surface components (66, 68) of one of the at least one pair of lateral abutment surfaces (60) are spaced apart by first and second gaps (G1, G2), respectively, from corresponding stopping surface components formed on the insert holder (22); and in the presence of a sufficiently large side load (Ft) on the cutting insert (24) in a direction transverse to the first plane (P1), only one of the first and second lateral abutment surface components (66, 68) contacts a corresponding one of said stopping surface components formed on the insert holder (22), and wherein:

the pair of upper abutment surfaces (58) and the at least one pair of lateral abutment surfaces (60) are longitudinally separated, wherein two cutting edges (56) are formed on the upper peripheral edge (54) and two pairs of lateral abutment surfaces (60) are formed on the upper surface (48).

19. The cutting insert (24) according to claim 15, wherein the cutting insert (24) exhibits minor symmetry about a second plane (P2) perpendicular to the first plane (P1).

20. The cutting insert (24) according to claim 15, wherein the at least one pair of lateral abutment surfaces (60) is recessed with respect to the pair of upper abutment surfaces (58).

21. The cutting insert (24) according to claim 15, wherein clamping contact occurs at first and second clamping contact zones (Z1, Z2) on first and second upper abutment surface components (62, 64) of the pair of upper abutment surfaces (58), respectively, wherein the first and second clamping contact zones (Z1, Z2) form two points separated by a contact distance (D) and the cutting insert (24) has a width (W) when viewed in cross-section, and wherein the contact distance (D) is equal to or less than 0.50 W.

22. The cutting insert (24) according to claim 15, wherein the first plane (P1) intersects the at least one cutting edge (56).

23. The cutting tool (20) according to claim 1, wherein the pair of upper clamping surfaces (36) is positioned forward or rearward of the pair of lateral stopping surfaces (34).

24. The cutting tool (20) according to claim 1, wherein the pair of upper abutment surfaces (58) is formed longitudinally between and separated from two pairs of lateral abutment surfaces (60).

25. The cutting insert (24) according to claim 15, wherein the pair of upper abutment surfaces (58) is formed longitudinally between and separated from two pairs of lateral abutment surfaces (60).

* * * * *